Oct. 25, 1932.                R. S. SANFORD                1,884,275
                                  BRAKE
              Filed Feb. 4, 1926                    2 Sheets-Sheet 1
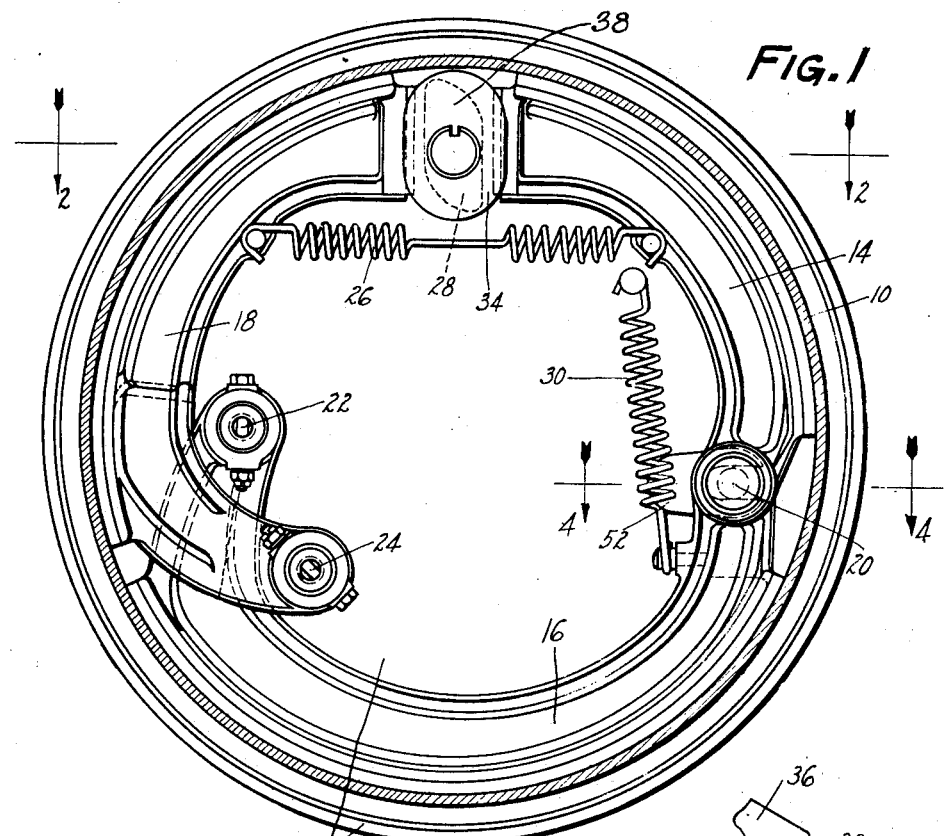
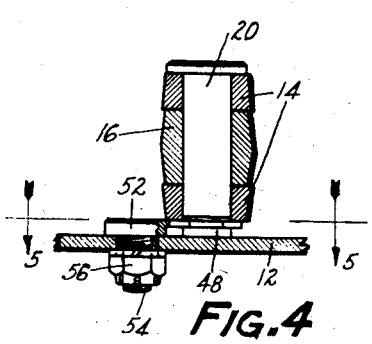
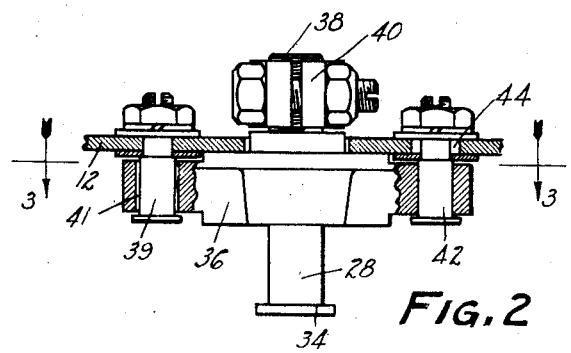
INVENTOR
ROY S. SANFORD
BY
M. W. McConkey
ATTORNEY Oct. 25, 1932.  R. S. SANFORD  1,884,275
BRAKE
Filed Feb. 4, 1926   2 Sheets-Sheet 2

INVENTOR
ROY S. SANFORD
BY
M. W. McConkey
ATTORNEY

Patented Oct. 25, 1932

1,884,275

UNITED STATES PATENT OFFICE

ROY S. SANFORD, OF SOUTH BEND, INDIANA, ASSIGNOR TO BENDIX BRAKE COMPANY, OF SOUTH BEND, INDIANA, A CORPORATION OF ILLINOIS

BRAKE

Application filed February 4, 1926. Serial No. 85,962.

This invention relates to brakes, and is illustrated as embodied in a three-shoe "Bendix" internal expanding brake for an automobile.

A feature of the invention relates to a novel stop for determining the released position of one of the shoes, or an equivalent part, for example a forked stop straddling a shank formed by grooving the pin connecting two of the shoes, or some other part moving with the shoes. Whether the stop is of this particular form or not, and whether or not it acts directly on the shoes, according to an important feature of the invention it is adjusted automatically by the force of applying the brake, to preserve a uniform clearance when the brake is released. That is, the stop is automatically set by applying the brake, and is held in the adjusted position so found, for example by friction clamping means.

Other features of the invention relate to overlapping the anchored ends of two jointly-effective shoes, by passing one shoe through an opening in the other, and to a novel shifting bracket carrying the cam or some equivalent device, and to other novel combinations of parts and desirable particular constructions which will be apparent from the following description of the illustrative embodiments shown in the accompanying drawings, in which:

Fig. 1 is a vertical section through the brake, just inside the head of the drum, and showing the shoes in side elevation;

Fig. 2 is a partial horizontal section on the line 2—2 of Fig. 1, showing the cam and its shiftable supporting bracket;

Fig. 3 is a detail section on a line corresponding to the line 3—3 of Fig. 2, but showing one end of a bracket of different form;

Fig. 4 is a partial radial section on the line 4—4 of Fig. 1, showing the novel self-adjusting stop;

Fig. 5 is a section on the line 5—5 of Fig. 4, showing the stop in end elevation;

Figure 6:
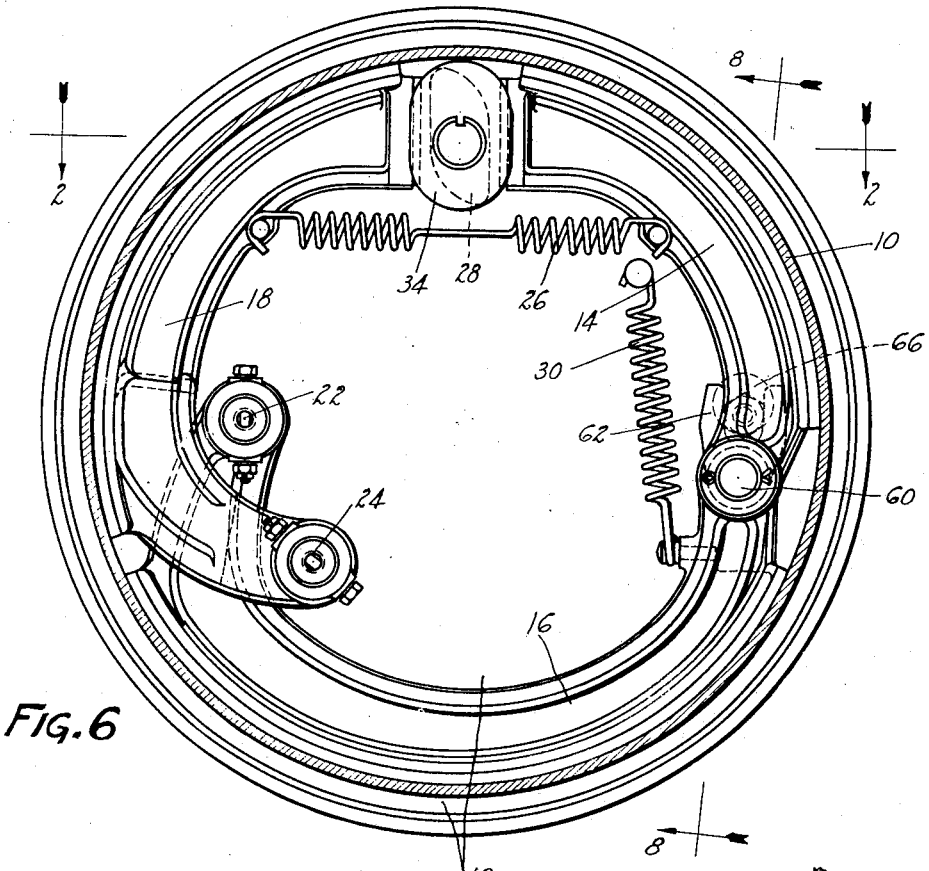
Fig. 6 is a vertical section corresponding to Fig. 1, but showing an eccentric manually-adjusted stop.

The brake of Fig. 1 includes a drum 10, the open side of which is closed by a backing plate or the like 12, and within which is arranged friction means illustrated as three shoes 14, 16, and 18. Shoe 14 is pivotally connected to shoe 16 by a pivot pin 20 (Fig. 4), while shoe 16 is anchored on the backing plate by a pivot pin 22 and shoe 18 is anchored by a pivot pin 24. The two end shoes 14 and 18 are expanded to apply the brake, against the resistance of a return spring 26, by means such as a double cam 28, whereupon shoe 18 turns with the drum and applies shoe 16 against the resistance of an auxiliary return spring 30.

Figure 7:
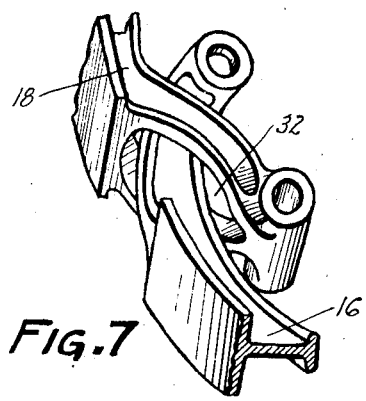
Fig. 7 is a partial perspective of the overlapping anchored ends of two of the shoes.

As will appear from a comparison of Figs. 1 and 7, shoe 18 is "T"-shaped in cross-section throughout most of its length, but at its lower end is channel-shaped, the channel portion being offset inwardly of the curve of the shoe to anchor 24, and being formed with an opening 32 for the anchored end of shoe 16.

Preferably cam 28 has an end flange 34 which, with a bracket 36 in which the spindle 38 of the cam is journalled, confines the free ends of shoes 14 and 18 laterally. An arm 40 clamped on the end of spindle 38 may be operated to rock the cam and apply the brake.

Bracket 36 is very lightly clamped to the backing plate 12, so that it is free to shift to permit cam 28 to center itself automatically with respect to the shoes. For convenience in assembly and initial adjustment, the bracket is held by two bolts, a bolt 39 carried by the backing plate and projecting through a larger slot 41 in the bracket, and a bolt 42 carried by the bracket and projecting through a larger slot 44 in the backing plate. In Fig. 3, a notch 46 formed in the backing plate 36 is substituted for slot 41.

Articulating pin 20 is shown (Fig. 4) formed at its end with a groove, defining an end flange 48 and a somewhat smaller shank formed by the bottom of the groove and which is straddled by forked arms 50 (Figure 5) projecting at the end of a radially-arranged arm or stop 52 having a threaded stem 54 projecting through the backing plate, to which the stop is frictionally clamped by a nut 56.

Arms 50 are a little further apart than the diameter of the shank of pin 20 which is embraced between them, by an amount which determines the clearance of shoe 16 with respect to the drum when the brake is released. Thus, when the brake is applied, after a short lost motion equal to the desired clearance, pin 20 engages the lower arm 50 (Fig. 1), shifting the arm or stop if necessary against the frictional resistance provided by nut 56, thus automatically setting the stop. Now when the brake is released, spring 30 pulls pin 20 against the other arm 50, but as the spring is not strong enough to shift the stop, this other or upper arm 50 (Fig. 1) determines the released position of shoe 16. As the brake lining wears, stop 52 is shifted more and more, but the clearance of shoe 16 with respect to the drum when in released position remains always and automatically the same.

Figure 8:
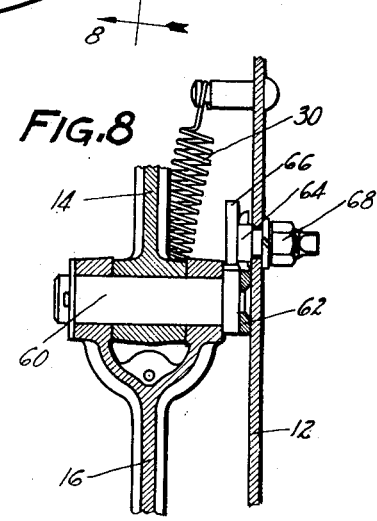
Fig. 8 is a partial section on the line 8—8 of Fig. 6, showing the details of the manually-adjusted stop.

In Figs. 6 and 8 is shown a manually-adjustable stop in place of stop 52. In this arrangement, articulating pin 60, corresponding to pin 20, carries on one end, preferably riveted on, a forked arm 62 straddling the shank 64 of an eccentric 66 serving as a positioning stop engaging the head of pin 60. Eccentric 66 may be turned as the brake lining wears, and is clamped in any desired position of adjustment by a nut 68. The adjustment may be made from outside the backing plate, but is not automatic, as with the first form.

While illustrative embodiments of my invention have been described in detail, it is not my intention to limit its scope to those particular embodiments, or otherwise than by the terms of the appended claims.

I claim:

1. A brake comprising, in combination, a drum, an applying means, a separate anchoring means, a shoe anchored at one end and on said anchor means engageable with the drum, a frictionally-held stop device determining the idle position of the unanchored end of the shoe and which is automatically shifted by brake-applying movement of the shoe beyond a predetermined amount, and a spring urging the shoe toward the idle position determined by said device.

2. A brake comprising, in combination, a drum, a shoe anchored at one end and engageable with the drum, a stop device determining the idle position of the unanchored end of the shoe and which is automatically shifted by brake-applying movement of the shoe beyond a predetermined amount, a spring urging the shoe toward the idle position determined by said device, and a floating shoe connected to the unanchored end of the first shoe and movable with the drum to overcome the spring and force the first shoe against the drum, at the same time shifting said device to adjust it.

3. A brake comprising, in combination, a pair of connected shoes, an anchor at the unconnected end of one shoe, an applying device at the unconnected end of the other shoe, means urging the anchored shoe toward idle position and overcome by the unanchored shoe in applying the brake, and a device determining the idle position of the anchored shoe and automatically shifted by applying movement of the anchored shoe beyond a predetermined amount to preserve a uniform clearance of the anchored shoe.

4. A brake comprising, in combination, a pair of shoes having a connection, an anchor at the unconnected end of one shoe, an applying device at the unconnected end of the other shoe, means urging the anchored shoe toward idle position and overcome by the unanchored shoe in applying the brake, and a device acting on said connection and determining the idle position of the anchored shoe and automatically shifted by applying movement of the anchored shoe beyond a predetermined amount to preserve a uniform clearance of the anchored shoe.

5. A brake comprising, in combination, friction means, a part moving when the brake is applied and released, a device having portions on opposite sides of said part but spaced apart enough more than the width of said part to allow a short lost motion, and friction clamping means normally holding said device, the device being set automatically by said part against the resistance of the clamping means when the brake is applied and then serving as a positioning stop for the friction means when the brake is released.

6. A brake comprising, in combination, friction means, a stationary support, a part whose movement is in proportion to the movement of the friction means as the brake is applied and released, an angularly-movable stop member carried by the support and provided with portions on opposite sides of said part, and means for resisting movement of the stop member, said part engaging one portion of the stop member after a short lost motion and shifting the stop member angularly when the brake is applied, the other portion of the stop member engaging said part and determining its idle position when the brake is released.

7. A brake comprising, in combination, friction means, a stationary support, a part carried by and movable with the friction means as the brake is applied and released, an angularly-movable stop member carried by the support and provided with portions on opposite sides of said part, and means for resisting movement of the stop member in either direction, said part engaging one portion of the stop member after a short lost motion and shifting the stop member angularly when the brake is applied, the other portion of the stop member engaging said part and determining the idle position of the friction means when the brake is released.

8. A brake comprising, in combination, friction means, a part movable therewith, and a frictionally-clamped stop member having portions on opposite sides of said part, one portion being engaged by said part when the brake is applied, and the other portion being engaged by said part after a short lost motion when the brake is released.

9. A brake comprising, in combination, friction means, a part movable therewith, and a frictionally-clamped forked stop member having arms on opposite sides of said part, one arm being engaged by said part when the brake is applied, and the other arm being engaged by said part after a short lost motion when the brake is released.

10. A brake comprising, in combination, a drum, expansible and contractible friction means engageable with the drum, a device carried by and movable with the friction means, and a device which does not move with the friction means, one of said devices being clamped in place but angularly movable and having spaced portions one of which is engaged by the other device when the brake is applied in a manner to shift both of said portions angularly, and the other of which portions is engaged after a short lost motion by said other device when the brake is released.

11. A brake comprising, in combination, a drum, expansible and contractable friction means engageable with the drum, a device carried by and movable with the friction means, and a device which does not move with the friction means, one of said devices being frictionally clamped against movement and having spaced portions one of which is engaged by the other device when the brake is applied in a manner forcibly to shift both of said portions, and the other of which portions is engaged after a short lost motion by said other device when the brake is released.

12. A brake comprising, in combination, a drum, expansible and contractable friction means engageable with the drum, a device carried by and movable with the friction means, and a device which does not move with the friction means, one of said devices having arms straddling the other device and spaced apart far enough to allow a short lost motion to said other device and arranged substantially radially of the drum.

13. A brake comprising, in combination, a drum, expansible and contractable friction means engageable with the drum, a device carried by and movable with the friction means, and a device having arms which does not move with the friction means, together with means frictionally holding the device having the arms against shifting but overcome to shift the arms when the brake is applied.

14. A brake comprising, in combination, shoes, a pin connecting the shoes and formed with a shank and an adjacent flange, and a forked stop straddling the shank and engaged by said flange.

15. A brake comprising, in combination, shoes, and means for connecting and positioning the shoes including a pair of interengaging positioning devices, one moving with the shoes and the other normally stationary, one device having a shank and an adjacent flange, and the other being a forked arm straddling said shank in engagement with the flange.

16. A brake comprising, in combination, shoes, and means for connecting and positioning the shoes including a pair of interengaging positioning devices, one moving with the shoes and the other normally stationary, one device having a shank and an adjacent flange, and the other being a forked arm straddling said shank in engagement with the flange, the forked arm being arranged radially of the brake and having its opposite portions spaced apart far enough to allow a short lost motion to the other device.

17. A brake comprising, in combination, shoes, and means for connecting and positioning the shoes including a pair of interengaging positioning devices, one moving with the shoes and the other normally stationary, one device having a shank and an adjacent flange, and the other being a forked arm straddling said shank in engagement with the flange, the forked arm being arranged radially of the brake and having its opposite portions spaced apart far enough to allow a short lost motion to the other device, together with means for holding one of said devices lightly enough to permit the other device to shift it when the brake is applied.

18. A brake comprising, in combination, a drum, friction means, a stop member having spaced arms extending radially of the drum, and a part between said arms and slightly smaller than the distance between the arms, the application of the brake causing shifting of the stop member by engagement of one of the arms with said part, and the other arm and said part engaging after a short lost motion when the brake is released.

19. A brake comprising, in combination, a drum, friction means, a pivoted stop member having spaced arms extending radially of the drum, a part between said arms and slightly smaller than the distance between the arms, and means resisting movement of the stop member about its pivot, the application of the brake causing angular shifting of the stop member against the resistance of said means by engagement of one of the arms with said part, and the other arm and said part engaging after a short lost motion when the brake is released, the release of the brake not being powerful enough to shift the stop member.

20. A brake comprising, in combination, shoes, a pin pivotally connecting the shoes, a support, and a stop member carried by the support and having radially-extending arms straddling said pin and spaced apart slightly more than the diameter of the pin.

21. A brake comprising, in combination, shoes, a pin pivotally connecting the shoes, a support, and a stop member carried by the support and having radially-extending arms straddling said pin and spaced apart slightly more than the diameter of the pin, and means for clamping the stop member to the support lightly enough to permit the pin to shift it when the brake is applied but not lightly enough to permit the pin to shift it when the brake is released.

22. A brake comprising, in combination, shoes, a pin pivotally connecting the shoes, a support, and a stop member carried by the support and having radially-extending arms straddling said pin and spaced apart slightly more than the diameter of the pin, and means for clamping the stop member to the support lightly enough to permit the pin to shift it when the brake is applied but not lightly enough to permit the pin to shift it when the brake is released, the pin having a shank straddled by said arms and an adjacent flange interlocking with said arms to position the shoes laterally.

23. A brake comprising, in combination, a retarding device, an adjacent supporting device, and a pair of interengaging and relatively-movable devices, one of which is mounted on the supporting device and the other of which moves with the retarding device, and which devices determine the released position of the retarding device, one of the interengaging devices being frictionally gripped to one of said other devices and being shifted to a new position, against the resistance of the frictional gripping by engagement with the other interengaging device in case of wear of the retarding device, said new position being such as to compensate for the wear.

24. A brake comprising, in combination, a retarding device, an adjacent supporting device, a pair of interengaging and relatively-movable devices, one of which is stationary and the other of which moves with the retarding device, and which devices determine the released position of the retarding device, and means securing one of the interengaging devices to the supporting device in a manner permitting it to shift on the application of considerable force and permitting it to be shifted to a new position, against the resistance of said means, by engagement with the other device in case of wear of the retarding device, said new position being such as to compensate for the wear.

25. A brake comprising, in combination, friction means, supporting means, and positioning means for the friction means including two devices, one of which is formed with a slot and the other of which has a part received in said slot, and one of which moves with the friction means and the other of which is normally stationary, together, with frictional means normally holding one of said devices gripped to said supporting means but permitting it to shift to correct its position automatically.

26. A brake comprising, in combination, a drum, friction means engageable with the drum, and a slotted guide for a portion of the friction means which predetermines its brake-applying movement.

27. A brake comprising, in combination, a drum, friction means engageable with the drum, and a guide for a portion of the friction means extending substantially along a chord of the drum and which predetermines the brake-applying movement of said portion of the friction means.

28. A brake comprising, in combination, a drum, a friction device having a movable guide member, and a normally-stationary part having a slot extending along a chord of the drum and embracing said member.

29. An adjusting device comprising a pivot having a slotted extension at one end.

30. A brake comprising, in combination, shoes, a pin connecting the shoes, an eccentric stop engaging the pin and having a shank, and a forked part carried by the pin and straddling said shank.

In testimony whereof I have hereunto signed my name.

ROY S. SANFORD.